United States Patent

[11] 3,620,670

[72] Inventors Geoffrey Charles Bratt
Tasmania, Australia;
Dereck Wilson Brown, Singapore,
Singapore
[21] Appl. No. 843,295
[22] Filed July 22, 1969
[45] Patented Nov. 16, 1971
[73] Assignee Electrolytic Zinc Company of Australia Limited
Melbourne, Victoria, Australia
[32] Priority July 25, 1968
[33] Australia
[31] 41175/68

[54] RECOVERY OF LEAD VALUES FROM SOLUTION
2 Claims, 1 Drawing Fig.
[52] U.S. Cl. .................................................. 23/127,
23/119, 23/301, 23/303, 23/312
[51] Int. Cl. .................................................. C01g 21/20
[50] Field of Search ........................................ 23/127,
117, 301, 305, 312, 119; 204/119

[56] References Cited
UNITED STATES PATENTS
3,440,155  4/1969  Pickering et al. .............  204/119
OTHER REFERENCES
McPherson & Henderson Book, " A Course in General Chemistry," Third Ed., Revised (1927), page 211, Ginn & Co., New York.
Hackh' s Chemical Dictionary, by Julius Grant, Third Ed., Revised, 1944, page 823, McGraw-Hill Book Company, New York.

Primary Examiner—Edward Stern
Attorney—Pierce, Scheffler & Parker

ABSTRACT: Recovery of lead values from lead-bearing material, by leaching the said material at ambient temperature for a period not exceeding 1 hour with a mixture of ammonium sulfate and aqueous ammonia to produce a supersaturated solution, separating undissolved substances, treating the resultant solution at a temperature higher than that at which the leaching operation was effected without substantial loss of ammonia, to cause precipitation of a major portion of the lead content from the said solution, and separating the precipitated solids.

Simplified representation of equilibrium solubilities of lead sulphate in ammoniacal ammonium sulphate solutions at 25°c.

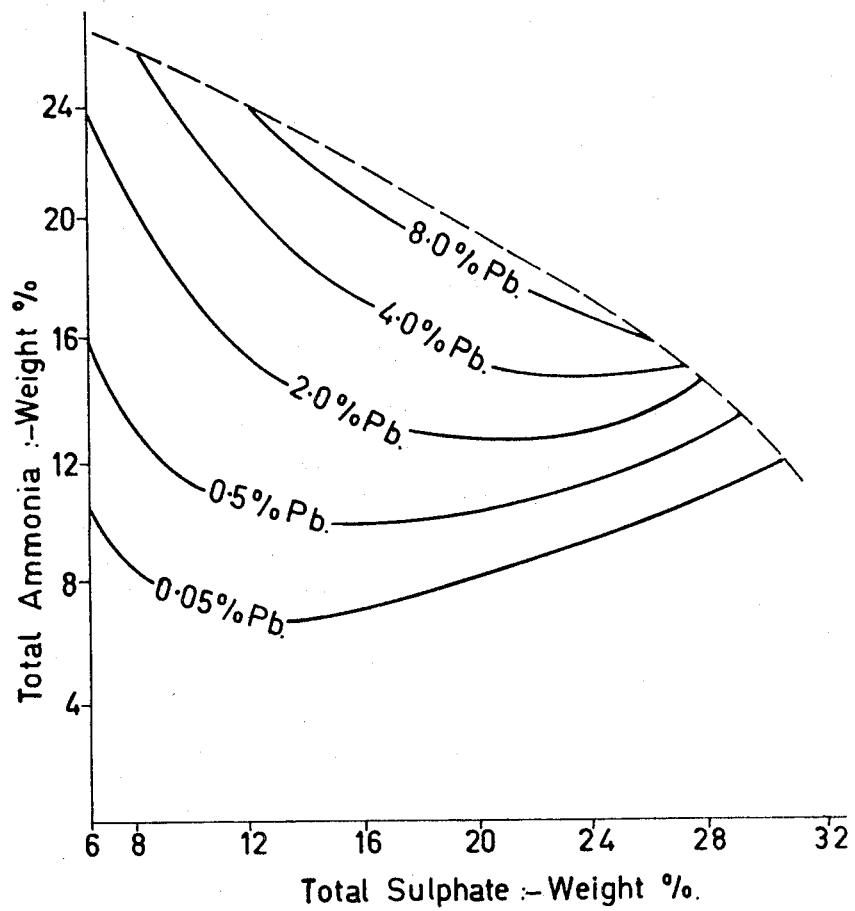
Simplified representation of equilibrium solubilities of lead sulphate in ammoniacal ammonium sulphate solutions at 25°c.
INVENTORS
Geoffrey Charles Bratt
Dereck Wilson Brown

RECOVERY OF LEAD VALUES FROM SOLUTION

This invention relates to a process for the dissolution of lead values from lead-bearing material, as hereinafter specified, by an aqueous ammoniacal ammonium sulfate solution, and the recovery of lead values from the aforementioned solution.

Materials which may be treated in accordance with this invention include ores, concentrates, residues, calcines, drosses, slags, dusts or fumes which contain lead. It will be understood that the lead must be present as oxide, sulfate or basic sulfate or converted to one of these compounds by suitable pretreatment.

In this specification and in the appended claims, the following abbreviations are used:

g. = grams
g./l. = grams per liter
ml. = milliliters
S.G. = specific gravity
wt. = weight
hr. = hour
T/Pb = total lead
T/NH$_3$ = total ammonia
T/SO$_4$ = total sulfate In our U.S. Pat. No. 3,440,155 we have described and claimed a process for the extraction of lead values from such materials. This process includes pretreatment by suitable techniques to ensure the conversion of the lead in the starting material to the oxide, hydroxide, sulfate or basic sulphate, the dissolution of these lead compounds in an aqueous ammoniacal ammonium sulfate solution of selected composition, and the subsequent recovery of lead or lead compounds by a number of techniques.

One method which may be employed for the recovery of lead compounds from the pregnant liquors is by distilling ammonia from such solutions. This method permits the precipitation of lead ammonium sulfate monobasic lead sulfate or mixtures of these two compounds. By adjusting the solution composition, either by selection of the components added during leaching or by additions during or immediately prior to distillation, so that the total sulfate concentration is in the range 190 g./l. to 360 g./l. and the total ammonia concentration is in the range 80 g./l. to 240 g./l., the product from the distillation will be substantially all lead ammonium sulfate Such a procedure is useful in many process applications especially when waste heat is available from other operations.

It has now been found that by careful selection of the amounts of ammonium sulfate ammonia and water added to the material during leaching and by avoiding unnecessarily long leaching times, a lead-bearing solution is produced which is termed supersaturated, as hereinafter defined. Further it has been found that such supersaturated solutions are substantially stable at the leaching temperature in the range 15°–35° C., but which on warming for short periods to temperatures above 45° C., e.g., at a temperature in the range 45°–65° C. for from 0.5 to 2.0 hours, especially in the presence of seed crystals, become unstable and precipitate a major part of the dissolved lead. It has been further found that by suitable selection of the sulfate level obtained in the leach liquor, the lead compound precipitated is substantially lead ammonium sulfate When a lead compound such as lead sulfate or a material containing lead sulfate is agitated with a mixture of ammonium sulfate and aqueous ammonia for a prolonged period of time, lead-bearing solution is produced which, after removal of undissolved substances, may be stored for an indefinite time without precipitation of lead compounds. Such solutions are considered to be saturated or equilibrium solutions. The composition of these equilibrium solutions may conveniently be defined by a diagram such as the accompanying FIG.

We have also found that if the period of agitation does not exceed 1 hour and the solution composition is properly selected it is possible to dissolve more lead than if agitation is continued until the equilibrium concentration is reached. After removal of undissolved substances and on prolonged standing or warming such solutions will deposit lead compounds until the solution achieves the equilibrium composition. Solutions having these characteristics are herein termed supersaturated solutions.

According to the present invention there is provided a process for the recovery of lead values from lead-bearing material, as hereinbefore defined, which includes leaching at ambient temperature, for a period not exceeding 1 hour, with a mixture of ammonium sulfate and aqueous ammonia to produce a supersaturated solution, as hereinbefore defined, separating undissolved substances, treating the resulting solution at a temperature higher than the leaching operation and without substantial loss of ammonia to cause precipitation of a major part of the lead therein, and separating the precipitated solids and liquor. After separation of the precipitated solids, the liquor may be recycled to the leaching stage.

In one form of the invention there is provided a process for the recovery of lead values from lead-bearing materials, which includes the leaching of the material with a mixture of ammonium sulfate and aqueous ammonia for a period of between 1 and 60 minutes to produce a solution which is supersaturated and having a composition in the range total lead 10 to 140 g./l., total ammonia 125 to 225 g./l., total sulfate 200 to 370 g./l., separating the undissolved substances, heating the solutions to and maintaining them at a temperature in the range 40° to 60° C. in the presence of 0.1 to 40 g./l. of crystals of either lead ammonium sulfate or monobasic lead sulfate so as to precipitate a major portion of the lead as a mixture containing varying proportions of lead ammonium sulfate and monobasic lead sulfate The precipitation is preferably carried out under conditions which minimize ammonia loss.

In a preferred embodiment of the invention there is provided a process for the recovery of lead values from lead-bearing materials, which includes the leaching of the material with a mixture of ammonium sulfate and aqueous ammonia for a period of between 1 and 15 minutes, to produce a solution which is supersaturated and having a composition the range total lead 60 to 80 g./l., total ammonia 150 to 180 g./l., total sulfate 270 to 320 g./l., separating the undissolved substances, heating the said solution to and maintaining it at a temperature in the range 45° to 60° C in a vessel designed to minimize loss of ammonia gas and in the presence of 0.1 to 2.0 g./l. of crystals of lead ammonium sulfate for a period of between 0.5 and 2 hours so as to precipitate more than 50 percent of the lead contained therein as substantially pure lead ammonium sulphate. The precipitated lead compounds are substantially free from impurities such as copper and zinc which may be present in the solution.

After filtration to remove the lead compounds, the solution may be treated by a variety of methods to remove accumulated impurities. After cooling to 15° to 30° C. the solution is suitable for recycling to the leaching or solution preparation stage of a cyclic process.

To obtain a supersaturated solution composition in the desired range, the amounts of lead-bearing material, recycled solution, fresh aqueous ammonia (to allow for losses due to spillage, evaporation, etc.) ammonium sulfate (either fresh or recycled from the decomposition of lead ammonium sulfate) may be blended in the required proportions. The volatilization of ammonia from the supersaturated solution increases as the temperature increases and hence to substantially avoid losses due to such volatilization the various operations are preferably conducted in closed vessels.

That precipitated lead material which is substantially pure lead ammonium sulfate may suitably be treated to recover the lead values in the form of lead sulfate, and to provide ammonium sulfate suitable for recycling to the leaching stage. This may be effected by repulping the lead precipitate with water or with an aqueous ammonium sulfate solution containing up to about 21 percent by weight of ammonium sulfate (at the conclusion of the decomposition) at an elevated temperature (in the range 50° to 100° C.). The lead ammonium sulfate is thereby decomposed into its component salts, and the insoluble lead sulfate may be separated by conventional techniques and the ammonium sulfate solution recycled.

Alternatively, the lead ammonium sulfate may be treated to recover the lead values in the form of lead sulphate, and to provide gaseous ammonia and sulfur trioxide for recycling to the leaching stage. This may be effected by heating the lead ammonium sulfate to a temperature in the range 380° to 450° C. The lead sulfate is then in the form suitable for reduction to metallic lead by conventional pyrometallurgical methods and the gases containing ammonia and oxides of sulfur may be treated by water scrubbing operations to yield ammonium sulfate, which may be recycled.

That precipitated lead material which is substantially pure monobasic lead sulfate may be treated directly by conventional pyrometallurgical reduction methods to produce metallic lead or it may be given a prior treatment with concentrated ammonium sulfate solutions at an elevated temperature (in the range 50° to 100° C.) to form lead sulfate and regenerate gaseous ammonia.

Mixtures of lead ammonium sulfate and monobasic lead sulfate may be treated by a combination of the above methods according to their composition.

The present process possesses a number of inherent advantages compared with previously disclosed processes. Thus the crystallization of lead ammonium sulfate at low temperatures avoids the costs and process complications associated with the precipitation by steam distillation operations. The recovery of lead finally as lead sulfate, after decomposition of the lead ammonium sulfate, or conversion of monobasic lead sulfate to lead sulphate, means that if the material fed to the leaching step is, or contains, lead sulfate, then a ready control of the sulfate balance of the system is possible. This process also recovers the lead values from solution in a form that is readily amenable to further treatment for the recovery of metallic lead.

From the previous description it will be understood that this process may be readily operated either as a batch or as a continuous operation.

The invention is illustrated by the following examples:

EXAMPLE 1

A solution (solution A) of composition

| | |
|---|---|
| Pb | 70.5 g/l |
| T/NH$_3$ | 165 g/l |
| T/SO$_4$ | 285 g/l | was prepared by agitation together for 15 minutes at 25° C of the following materials.

| | |
|---|---|
| PbSO$_4$ | 24 g |
| 0.880 aqueous ammonia | 74 ml |
| (NH$_4$)$_2$SO$_4$ | 86 g |
| Water | 108 ml |

Complete dissolution of the solids occurred. Portion of this solution A was set aside and maintained at 25° C. After 24 hours no crystallization of lead compounds had occurred.

Another portion of solution A of volume 194 ml was heated to 50° C and maintained at this temperature for 3 hours in a closed vessel. Crystallization of lead ammonium sulfate occurred. The washed and dried crystals contained 9 g. of lead as lead ammonium sulfate. That is, 65 percent of the lead in solution A had been recovered by crystallization.

After filtration to recover the crystals, the filtrate (solution B) was used to leach a further 10 g. of lead sulfate at 25° C. An addition of 4 g of ammonium sulfate was made to the leach solution to bring the solution into the desired range. (In practice this ammonium sulfate would be supplied from material recovered by the descomposition of lead ammonium sulphate).

The resulting liquor (solution C) was seeded with 0.1 g. of the wet crystals obtained from solution A and heated and maintained at 50° C. for 30 minutes. Crystallization occurred and lead ammonium sulfate containing 6.6 g. of lead was removed by filtration. That is, 66 percent of the lead in solution C was recovered as lead ammonium sulfate.

EXAMPLE 2

A solution (solution D) was produced by agitation together for 15 minutes at 25° C of the following components:

| | |
|---|---|
| 187.6 | g. process residue containing 7.6% Pb as PbSO$_4$ |
| 86 | g. ammonium sulfate |
| 74 ml. 0.880 aqueous ammonia | |
| 108 | ml. water | followed by filtration to remove the insoluble materials. The composition of solution D was

| | |
|---|---|
| Pb | 73.5 g./l. |
| T/NH$_3$ | 174 g./l. |
| T/SO$_4$ | 293 g./l. |

Comparison of the composition of solution D with saturated solutions of the same total ammonia and total sulfate depicted in the drawing shows that solution D contains about 24 g./l. lead in excess of the saturation value and hence is a supersaturated solution.

One hundred ml of solution D was warmed to and maintained to 50° C for one hour in the presence of 0.1 g. of previously prepared crystals of lead ammonium sulfate. After filtration and washing the precipitate, the filtrate and washings (88 ml.) (solution E) were analyzed and shown to contain only 48.4 g./l. lead. That is, 43.1 percent of the lead has been recovered from the solution as lead ammonium sulfate.

EXAMPLE 3

The effect of time, temperature and amount of seed crystals on the crystallization of lead ammonium sulfate is illustrated by the data tabulated below obtained using 120 ml. portions of the solution prepared in the same manner as solution A of example 1, and seed crystals of lead ammonium sulfate.

| Temp °C | Solution Treatment Time hrs | Wt. of Seed (g/l) | % Pb precipitated(1) |
|---|---|---|---|
| 50 | 0.25 | 4.2 | 14 |
| 50 | 0.75 | 4.2 | 48 |
| 50 | 2.00 | 4.2 | 54 |
| 50 | 1.00 | 0.84 | 58 |
| 50 | 1.00 | 4.2 | 54 |
| 45 | 1.00 | 0.84 | 43 |
| 35 | 1.00 | 0.84 | 0 |
| 25 | 1.00 | 0.84 | 0 |

(1)lead precipitated as lead ammonium sulfate excluding amount added as seed crystals.

EXAMPLE 4

Four hundred and thirty six grams of a residue (F) containing 11.1 percent total lead (85 percent soluble in 10 percent neutral ammonium acetate at the boiling point) was agitated for 15 minutes with a mixture of ammonium sulfate crystals 220 g. aqueous ammonia 201 mls (S.G. =0.891) and water 263 g. The solution obtained (solution G) after the removal of insoluble residue had a composition

| | |
|---|---|
| Pb | 63.4 g./l. |
| T/NH$_3$ | 164 g./l. |
| T/SO$_4$ | 290 g./l | and had a volume of 380 ml.

Three hundred and sixty five milliliter of solution G was warmed to 60° C. in the presence of 0.1 g. of lead ammonium sulfate crystals, and maintained at this temperature for 1 hr., then filtered. The products from filtration were a solution H and solids I which had the composition indicated below:

| Solution H | | Solids I (Sparingly washed, 1.8 displacements) | |
|---|---|---|---|
| Pb | 27.3 g./l. | Pb | 47.5% |
| T/NH$_3$ | 162 g./l. | T/NH$_3$ | 7.7% |
| T/SO$_4$ | 292 g./l. | T/SO$_4$ | 43.5% |
| | | Wt. (washed and dried) 34.72 g. | |

The theoretical composition of lead ammonium sulfate is lead 47.6 percent, total ammonia 7.85 percent, total sulfate 44.1 percent.

Thus in the primary leach 99 percent of the lead soluble in 10 percent neutral ammonium acetate at the boiling point was dissolved, and during the precipitation stage 57 percent of the lead contained in the solution was precipitated as lead ammonium sulfate.

Portion of solution H was adjusted in composition by additions of aqueous ammonia (to compensate for losses during handling) and ammonium sulfate (to compensate for removal as lead ammonium sulfate and then used to leach a further portion of residue F. The resulting solution was treated in the same way as solution G. This procedure was repeated five times, the lead extraction during each stage of leaching being greater than 97 percent and the yield of lead compounds during the precipitation stages were 71, 71, 76, 73, and 72 respectively. The liquor after the final precipitation stage was analyzed for impurities which had been derived from residue F and shown to contain

| Zn | 2.75 g./l. |
|---|---|
| Cu | 0.42 g./l. |
| CaO | 0.03 g./l. |
| MgO | 0.03 g./l. |
| Cd | 0.004 g./l. |

The solids precipitated during the final stage were also analyzed for impurities in a sparingly washed state (1.8 displacement wash with lead-free aqueous ammonium sulfate solution) and after extensive water washing. The results obtained are tabulated below:

| | Precipitated Solids Analysis | |
|---|---|---|
| | Sparingly washed | Thoroughly washed |
| Zn | 0.22 | 0.01 |
| Cu | <0.01 | <0.01 |
| CaO | 0.2 | 0.15 |
| MgO | <0.05 | <0.05 |
| Cd | <0.01 | <0.01 |

We claim:

1. A process for the recovery of lead values from a material containing a least one compound selected from the group consisting of lead oxide, lead sulfate and basic lead sulfate which comprises leaching the said material at a temperature in the range 15° to 15° C. and for a period not exceeding 1 hour with a mixture of ammonium sulfate and aqueous ammonia to produce a supersaturated solution having a composition within the range total sulfate 200 to 370 g./l., total ammonia 125 to 225 g./l. and total lead 10 to 140 g./l., separating undissolved substances, treating the resulting solution at a temperature in the range 45° to 65° C., in the presence of 0.1–40.0 g./l. of seed crystals of a salt selected from the group consisting of lead ammonium sulfate and basic lead sulfate, for a period of between 0.5 hour and 2.0 hours without substantial loss of ammonia to cause precipitation of a major portion of the lead therein as a member of the group consisting of lead ammonium sulfate, monobasic lead sulfate, and mixtures of these two compounds, and separating the precipitated solids and liquor.

2. A process for the recovery of lead values from a material containing at least one compound selected from the group consisting of lead oxide, lead sulfate and basic lead sulfate which comprises leaching the said material at a temperature in the range 15° to 35° C. and for a period not exceeding 1 hour with a mixture of ammonium sulfate and aqueous ammonia to produce a supersaturated solution having a composition within the range total sulfate 200 to 370 g./l., total ammonia 125 to 225 g./l. and total lead 10 to 140 g./l., separating undissolved substances, treating the resulting solution at a temperature in the range 45° to 65° C., in the presence of 0.1–40.0 g./l. of seed crystals of a salt selected from the group consisting of lead ammonium sulfate and basic lead sulfate, for a period of between 0.5 hour and 2.0 hours without substantial loss of ammonia to cause precipitation of a major portion of the lead therein as a member of the group consisting of lead ammonium sulfate, monobasic lead sulfate and mixtures of these two compounds, separating the precipitated solids and recycling the liquor to the leaching stage.

* * * * *

UNITED STATES PATENT OFFICE
CERTIFICATE OF CORRECTION

Patent No. 3,620,670      Dated November 16, 1971

Inventor(s) Geoffrey Charles Bratt and Dereck Wilson Brown

It is certified that error appears in the above-identified patent and that said Letters Patent are hereby corrected as shown below:

Claim 1, line 5, change "15° to 15° C" to

-- 15° C. to 35° C. --

Signed and sealed this 23rd day of May 1972.

(SEAL)
Attest:

EDWARD M. FLETCHER, JR.
Attesting Officer

ROBERT GOTTSCHALK
Commissioner of Patents